Patented Apr. 30, 1946

2,399,395

UNITED STATES PATENT OFFICE 2,399,395

PROCESS FOR MAKING STYRENE FROM METHYL PHENYL CARBINOL

Leland C. Shriver, South Charleston, W. Va., assignor to Carbide and Carbon Chemicals Corporation, a corporation of New York No Drawing. Application September 23, 1943, Serial No. 503,528

9 Claims. (Cl. 260—669)

This invention is an improvement in processes for making styrene by the dehydration of phenyl methyl carbinol. More particularly the invention provides a catalytic, vapor phase, dehydration process by which styrene may be readily and conveniently obtained in a high state of purity.

That phenyl methyl carbinol may be dehydrated to form styrene is well known, and a number of catalysts have been proposed for this reaction. In carrying out the reaction it has been observed that, together with styrene, a dimer of styrene and, in lesser amount, an impurity having a boiling point lying very close to that of styrene are invariably formed. Depending upon such factors as the temperature, the catalyst and the feed rate, if the carbinol is added during the reaction, the efficiency losses due to formation of the dimer may run as high as 3.5 to 15 per cent. Then, too, the ether of phenyl methyl carbinol will be formed and appear in the reaction product by supplying carbinol during the course of the reaction at a feed rate so high that incomplete dehydration results. Although further dehydration of this ether to styrene takes place in the liquid phase only slightly more slowly than in the case of the carbinol, its separation from the reaction product before recycling is difficult. Both the ether and the dimer are very high boiling, with the dimer boiling about 20° C. above the ether.

In carrying out the dehydration in the liquid phase, the operation must be shut down from time to time to permit the removal of high boiling residues which accumulate in the reaction mixture. These high boiling residues result from the polymerization of styrene which is always present in the reaction mixture, and the need for shut-downs is aggravated also by the formation of the high boiling liquid dimer of styrene. Thus, at best, the liquid phase dehydration of styrene cannot be operated continuously. Under some conditions the accumulation of polymeric high boiling residue may be so large as to constitute an important percentage of the styrene which is formed, and as a consequence of this styrene polymerization the actual efficiency of the liquid phase dehydration is lowered correspondingly. Then, too, it is necessary to resort to a reaction vessel of complicated design and correspondingly expensive construction, in which the ratio of heating surface to liquid heated is very large, in order to keep the amount of hot liquid in the reaction vessel at a minimum and maintain a low styrene-polymerization loss.

Of equal, if not greater, importance from the standpoint of purity of the styrene is the difficulty of eliminating the impurity boiling close to styrene. The boiling point lies so close that its separation from styrene by distillation is not practicable. The amount of this difficultly removable impurity may vary widely with different catalysts but with none of the catalysts heretofore suggested has it been possible to obtain both a high activity and a high quality styrene.

I have discovered that styrene of high purity may be obtained by conducting the dehydration of phenyl methyl carbinol in the vapor phase over a titania catalyst. Although good results are obtainable with a number of grades of titania, it is desirable to employ titania of a high grade of purity for best results. The amount of difficultly separable impurity present in the high quality styrene produced according to the invention seems to be dependent at least to some extent upon the purity of the titania catalyst employed. For instance, an improvement in the quality of the styrene from about 99.2 per cent to upwards of 99.6 per cent is effected progressively on going from the pigment grade to the technical reagent grade to the so-called C. P. anhydrous grade of titania. Using technical grades of the titania the purity of the styrene obtained after separating from the crude reaction product the high boiling dimer as well as any unreacted carbinol and its ether, may run better than about 99.2 to 99.4 per cent, by weight. At the same time the yields of styrene may be maintained as high as 80 per cent or better, with efficiencies for the most part, if not always, well above 90 per cent. With purer, so-called C. P. grades of titania an even higher quality of styrene having a purity of about 99.5 to 99.7 per cent, by weight, or better may be obtained. The loss of efficiency due to dimer formation seems not to exceed about 2.5 to 6 per cent.

The titania catalyst may be used in supported form or in pellets. Typical of suitable inert supporting materials are crushed sandstone, silica filter stone and ceramically-bonded, fused aluminum oxide. For instance, the fused aluminum oxide may be wetted with water, titania powder amounting to about 10 to 15 per cent of the oxide then sprinkled on, and the catalyst and support dried at 150° C. Because of the tendency of the titania powder to dust off, it is possible that only about 5 to 8 per cent eventually remains. The activity of the itania powder may be increased about one-fifth by treating it with hot aqueous sulfuric acid (10 per cent), followed by thorough washing with water to remove the acid, before the titania is applied to the support. With titania supported on 4 x 6 mesh, ceramically-bonded, fused aluminum oxide production ratios of 400 to 650 grams of styrene per liter of catalyst per hour may be obtained. Considerably higher production ratios are possible with the titanium catalyst in pellet form. In pelleting the catalyst, titanium dioxide powder of a chemically pure anhydrous grade is thoroughly wet with water and the resultant paste dried at 130° to 150° C. The dried cake is powdered and then pelleted in a pelleting machine or other suitable device for making pellets. At this stage the pellets are rather weak, and although they may be screened, they dust somewhat freely in service in the vapor phase reaction. The pellets are then fired in an electric furnace at a temperature of at least 800° C., whereupon they become very strong and suitable mechanically. After the pellets have been fired they may be subjected to an activation step by immersion in boiling nitric acid (18–20 per cent concentration) for a period of about 90 minutes. Following the acid treatment the pellets are ready for charging to the converter after thorough washing with water and drying at about 130 to 150° C. In addition to nitric acid, hydrochloric acid, phosphoric acid or sulfuric acid may be used for the acid treatment. Between 800° and 1000° C., there appears to be a point in the heat treatment which results in a shrinkage of the pellet. The pellets are harder and denser, and a ⅜ inch pellet which will retain its size when fired at 800° C. may shrink to a diameter of about $\frac{1}{8}$ inch when fired at temperatures from about 900° to 1100° C. These denser, harder pellets do not seem to be as readily activated by nitric acid as those roasted at 800° C., even using the concentrated 70 per cent grade of nitric acid. They may be suitably activated, however, using aqueous phosphoric acid of 20 per cent concentration. The denser, harder pellet has the advantage that dusting of the catalyst, particularly during a charging operation, is largely eliminated, and for this purpose a roasting temperature of about 1000° C. is preferred.

In general, the smaller the pellet size the better the production ratio, although for mechanical reasons it may not be feasible to go to pellet sizes measuring less than $\frac{1}{8}$ inch in the largest dimension. On the larger side, however, good production ratios may be obtained with pellets measuring up to ⅜ inch in one or more dimensions, for instance, production ratios of about 400 to 600 grams per liter per hour using pellets ⅜ x $\frac{1}{8}$ inch. Little if any improvement in production ratios seems to result on going from a supported catalyst to catalyst pellets larger than ⅜ inch. On the other hand, production ratios of 800 to 1100 grams per liter per hour are obtainable on going to a pelleted catalyst of about $\frac{1}{8}$ inch diameter x $\frac{1}{8}$ inch size, the improvement amounting to approximately 100 per cent over the ⅜ inch pellet. These comparative values are for a catalyst bed approximately 1 inch in diameter and 12 to 15 inches long, using a feed containing about 20 per cent acetophenone. With catalyst beds 4.5 to 20 feet long the improvement with the pelleted catalyst in the $\frac{1}{8}$ x $\frac{1}{8}$ inch size is even more marked, with production ratios above 2000 grams per liter per hour being consistently obtainable, and even reaching as high as 3400 grams per liter per hour.

For the most part, the desirable temperatures of operation are found between 180° and 280° C. Usually it is unnecessary to use temperatures below 220° or above 250° C. At temperatures of 180° to 220° C. steam or reduced pressure may be employed to assist in vaporizing the carbinol. Higher temperatures from about 250° to 280° C. may be employed under certain conditions, for instance, if it is desired to obtain an economical production ratio with feed rate so high as to tend to result to incomplete dehydration.

The purity of the styrene obtainable according to the process of this invention is not adversely affected by the presence of acetophenone in the feed; at least not in amounts up to at least 25 per cent by weight of the feed. Thus the process is particularly well adapted to operate on the crude phenyl methyl carbinol obtained by hydrogenation of acetophenone and containing substantial amounts of unchanged acetophenone. The acetophenone passes substantially unchanged through the phenyl methyl carbinol converter and may be recovered from the styrene product.

Inasmuch as phenyl methyl carbinol is a material which is fairly readily dehydrated, it seems probable that a number of substances exhibiting dehydrating characteristics would serve to catalyze the reaction. The yields, the production ratios and the purity of the styrene produced with a number of materials which have previously been suggested are given in Table A. The phenyl methyl carbinol used in these runs was a mixture containing from about 5 to 20 per cent acetophenone.

*Table A*

| Description of material | Yield | Production ratio [2] | Styrene, freezing point | Styrene purity | Reaction temperature |
|---|---|---|---|---|---|
| | Per cent | | °C. | Per cent | °C. |
| Tungstic trioxide (green), 20% on support [1] | 73.8 | 428 | −30.84 | 99.49 | 250–260 |
| Aluminum phosphate, 20% on support [1] | 52.6 | 249 | −31.14 | 98.81 | 248–251 |
| Aluminum turnings (¼ inch) | 57.7 | 305 | −30.91 | 99.35 | 275–280 |
| Mossy zinc (⅜ inch) | 0 | | | | 245–285 |
| Stannic oxide, 15% on support [1] | 84.4 | 452 | −30.88 | 99.40 | 272–280 |
| Aluminum oxide, phosphoric acid treated | 95 | 511 | −31.32 | 98.42 | 225 |
| Thorium oxide, 10% on support [1] | 63 | 254 | −30.94 | 99.27 | 275 |

[1] 4 x 6 mesh ceramically bonded fused aluminum oxide.
[2] Grams of styrene per liter of catalyst per hour.

Similar data on runs using a number of additional materials as catalysts in the vapor phase dehydration reaction are listed in Table B.

actual efficiency on the basis of styrene recovered was 94.7 per cent while the efficiency loss due to dimer formation was 2.78 per cent.

Table B

| Description of material | Production ratio [2] | Styrene, freezing point | Styrene purity | Reaction temperature |
|---|---|---|---|---|
| | | °C. | Per cent | °C. |
| Alumina activated with 10 per cent sulfuric or phosphoric acids | 511 | −31.24 to −31.30 | 98.47 to 98.57 | 225 |
| Silica gel | 277 | −31.61 | 97.78 | 225 |
| Thorium oxide, 10% on support [1] | 254 | −30.96 | 99.22 | 275 |
| Cerium oxide, 10% on support [1] | 171 | | | 275 |
| Sodium bisulfate, 15% on support [1] | 555 | −30.85 | 99.47 | 225 |
| Sodium dihydrogen phosphate, 15% on support [1] | 400–500 | | | 250–275 |
| Magnesium pyrophosphate, pellets | 550–700 | −31.28 to −30.96 | 98.51 to 99.22 | 275 |
| Calcium sulfate, 10% on support [1] | 249 | −31.43 | 98.18 | 275 |
| Potassium dihydrogen phosphate, 15% on support [1] | 286 | | | 275 |
| Potassium phosphate, 15% on support [1] | 0 | | | 275 |

[1] Ceramically bonded, fused aluminum oxide.
[2] Grams of styrene per liter of catalyst per hour.

In determining the purity of the styrene produced, its freezing point was measured by resistance thermometry, the impurity present therein being calculated as ethyl benzene. For this purpose, −30.61° C. was taken as the melting point of pure styrene, and 2.22 per cent as the amount of ethyl benzene which lowers the freezing point 1.0° C. (a lowering of 0.44° C. for each mole per cent of impurity), according to values reported by the Bureau of Standards. The sensitivity of the resistance thermometer used was such that a change in resistance of 0.0001 ohm, corresponding to a change of 0.001° C., was measureable. Due to other variables, however, the precision is estimated as being not better than ±0.005° C.

The following examples are illustrative of the invention:

Example 1

A mixture containing 80.3 per cent phenyl methyl carbinol and 19.7 per cent acetophenone was vaporized and the vapor passed through a catalyst bed maintained at a temperature of 250° C. The catalyst was titania supported on 4 x 6 mesh, ceramically-bonded, fused aluminum oxide. The catalyst was prepared by sprinkling 15 parts by weight of a chemically pure grade of anhydrous titanium oxide on 85 parts by weight of the aluminum oxide support, wet with water. The resultant mass was then dried at a temperature of 130° to 150° C. The dried catalyst was packed in a 1 inch inside diameter steel tube provided with a concentric tube of ½ inch outside diameter to serve as a thermometer well. The feed rate was such that 2332 grams of mixture was passed over the catalyst bed in a period of 11.5 hours. The yield of products was as follows:

| | Per cent |
|---|---|
| Styrene | 82.6 |
| Dimer | 2.48 |
| Ether | 2.78 |
| Carbinol, unreacted | 10.03 |
| Loss | 2.11 |
| | 100.00 |

The percentage dehydration of the carbinol, as measured by the water produced was 85.2 per cent. The production ratio of styrene was 460 grams per liter per hour and the overall purity of the styrene produced was 99.71 per cent as indicated by its freezing point of −30.74° C. The

Example 2

In this run the chemically pure anhydrous grade titania was treated with hot aqueous sulfuric acid of 10 per cent concentration and washed thoroughly before being put on the aluminum oxide support. The feed was a mixture containing 87.7 per cent phenyl methyl carbinol and 12.2 per cent acetophenone by weight. In other respects the apparatus was identical with that described in Example 1. The temperature was maintained at 250° C., and the mixture was vaporized and supplied to the catalyst bed at such a rate that 1025 grams were fed over a period of 4.5 hours.

The percentage dehydration, as shown by the water produced, was 98.2 per cent. The production ratio was 574 grams of styrene per liter of catalyst per hour and the overall purity of the styrene produced was 99.58 per cent as indicated by its freezing point of −30.80° C. The yield of styrene was 92.2 per cent and the efficiency 92.2 per cent. The loss of efficiency attributable to dimer formation was 5.8 per cent.

Example 3

A mixture containing 79.4 per cent phenyl methyl carbinol and 20.6 per cent acetophenone was vaporized and the vapor passed into a bed of pelleted titania catalyst maintained at a temperature of 250° C. The catalyst was prepared by thoroughly wetting titanium dioxide powder of a chemically pure anhydrous grade with water and drying the resultant paste at a temperature of 130° C. to 150° C. After the dried cake had been powdered, the powder was formed into pellets of $\tfrac{3}{16}$ inch diameter x $\tfrac{3}{16}$ inch, and the pellets then fired or roasted in an electric furnace at a temperature of 800° C. Finally the pellets which were strong and very suitable mechanically, were treated by immersion in boiling aqueous nitric acid of 18 to 20 per cent concentration for a period of 1.5 hours, as an activation step. At the end of that time the pellets were washed with water thoroughly, dried at 130° C. to 150° C. and charged into a steel tube having an inside diameter of one inch. The length of the catalyst bed was 4.6 ft., corresponding to a catalyst volume of 0.0318 cubic ft. (900 cubic centimeters). The feed was maintained at such a rate that 97.6 pounds of mixture were supplied to the converted over a period of eight hours.

The yield of styrene was 82.5 per cent, and the efficiency was 90.2 per cent. The loss of efficiency due to dimer formation was 9.2 per cent. The production ratio was 214.5 pounds of styrene per cubic foot of catalyst per hour (3440 grams per liter per hour). The purity of the styrene produced was 99.53 per cent as indicated by its freezing point of −30.82° C.

Example 4

During a period of 3.33 hours, 1020 grams of a mixture containing 75.6 per cent phenyl methyl carbinol and 24.4 per cent acetophenone were vaporized and the vapor passed into contact with 168.5 cubic centimeters of pelleted titania catalyst. The pellets which were $\frac{1}{8}$ inch in diameter x $\frac{1}{8}$ inch were made as described in Example 3 but activated by boiling the catalyst pellets in aqueous hydrochloric acid of 20 per cent concentration, instead of in aqueous nitric acid. The catalyst was packed in a steel tube of 1 inch inside diameter provided with a concentric tube of $\frac{1}{4}$ inch outside diameter serving as a thermometer well, as described in Example 1. The temperature of the catalyst bed was maintained at 250° C. The yield of styrene was 79.4 per cent and the production ratio was 860 grams of styrene per liter of catalyst per hour. The freezing point of the styrene produced was −30.77° C., corresponding to an indicated purity of 99.64 per cent.

Example 5

A mixture containing 75.7 per cent phenyl methyl carbinol and 24.3 per cent acetophenone was vaporized and passed into an iron tube of one inch inside diameter containing a bed 15 ft. long of titania catalyst in the form of ⅜ inch pellets which had been fired at 1000° C. and reactivated with aqueous phosphoric acid of 20 per cent concentration. The rate of feed of the mixture was about 8.0 pounds per hour. Water was vaporized with the carbinol mixture and passed into the reactor at the rate of 1.3 pounds per hour. The average yield as determined by the specific gravity of the product was 65.2 per cent. After 20 hours of operation, the water feed was discontinued without any other change in operating conditions. The yield rose to 85.0 per cent for the succeeding 175 hours of operation. Throughout the run the reaction temperature was maintained at 240° C.

The invention is susceptible of modification within the scope of the appended claims.

What is claimed is:

1. A method of making styrene which comprises passing phenyl methyl carbinol in the vapor phase over a titania catalyst at a temperature sufficiently elevated to cause dehydration of the phenyl methyl carbinol.

2. A method of making styrene which comprises passing phenyl methyl carbinol in the vapor phase over a titania catalyst at a temperature from about 180° to 280° C.

3. A method of making styrene which comprises passing phenyl methyl carbinol in the vapor phase over a titania catalyst at a temperature from about 220° to 250° C.

4. A method of making styrene which comprises passing phenyl methyl carbinol in the vapor phase over a titania catalyst which has been brought into contact with strong mineral acid to activate it.

5. A method of making styrene which comprises passing phenyl methyl carbinol over a pelleted titania catalyst.

6. A method of making styrene which comprises passing phenyl methyl carbinol over a mechanically strong, pelleted titania catalyst, fired at a temperature from about 800° to 1100° C. after pelleting, and thereafter brought into contact with hot mineral acid to activate the catalyst pellets.

7. A method of making styrene which comprises passing phenyl methyl carbinol in admixture with water in the vapor phase over a mechanically strong, pelleted titania catalyst fired at a temperature from about 800° to 1100° C. after pelleting and thereafter brought into contact with strong mineral acid to activate the catalyst pellet.

8. A method of making styrene which comprises passing phenyl methyl carbinol in the vapor phase over a mechanically strong, pelleted titania catalyst having a pellet size not substantially greater than $\frac{1}{8}$ inch, at a temperature from about 220° to 280° C.

9. A method of making styrene which comprises passing phenyl methyl carbinol in the vapor phase over a mechanically strong, pelleted titania catalyst having a pellet size not substantially greater than $\frac{1}{8}$ inch in the longest pellet dimension and fired at a temperature of about 1000° C. and thereafter brought into contact with strong mineral acid to activate the catalyst pellet, at a temperature from about 220° to 250° C.

LELAND C. SHRIVER.